May 24, 1938.　　　J. C. McCUNE　　　2,118,412
COMBINED ELECTRIC AND PNEUMATIC BRAKE
Filed Feb. 1, 1936　　　2 Sheets-Sheet 1

INVENTOR
JOSEPH C. McCUNE.
BY Wm. M. Cady
ATTORNEY.

May 24, 1938.  J. C. McCUNE  2,118,412
COMBINED ELECTRIC AND PNEUMATIC BRAKE
Filed Feb. 1, 1936   2 Sheets-Sheet 2
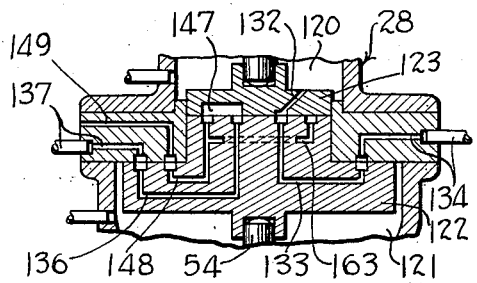
SERVICE OPERATION.
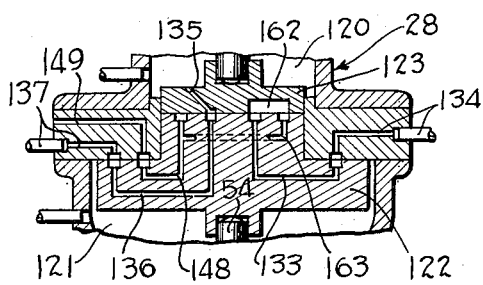
RELEASE OPERATION
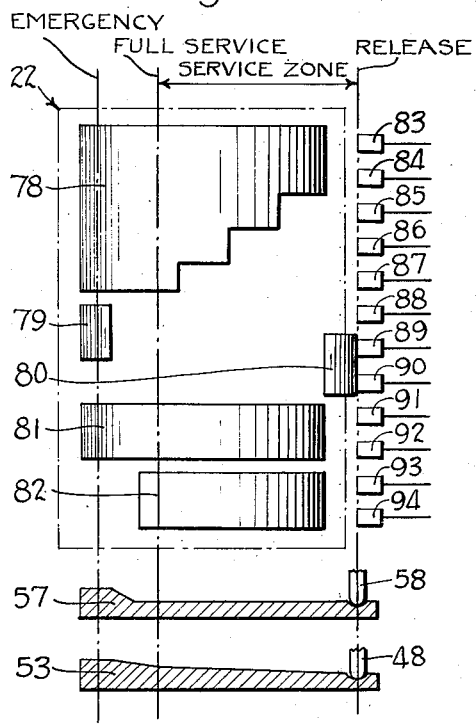
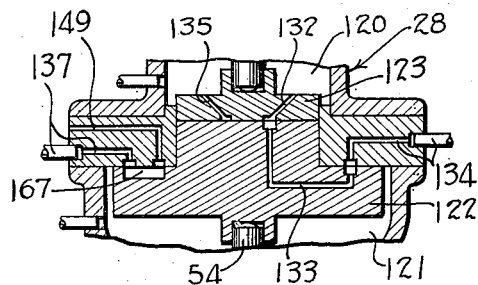
EMERGENCY OPERATION.
INVENTOR
JOSEPH C. McCUNE.
BY *Wm. M. Cady*
ATTORNEY Patented May 24, 1938

2,118,412

UNITED STATES PATENT OFFICE 2,118,412

COMBINED ELECTRIC AND PNEUMATIC BRAKE

Joseph C. McCune, Edgewood, Pa., assignor to The Westinghouse Air Brake Company, Wilmerding, Pa., a corporation of Pennsylvania Application February 1, 1936, Serial No. 61,962

24 Claims. (Cl. 303—3)

This invention relates to combined electric and fluid pressure brake equipments and in particular to brake equipments of this type for railway trains and traction vehicles.

In railway trains and traction vehicles intended for relatively high speed service, it is essential that adequate braking be provided to stop the train or vehicle in a reasonably short distance. Because the braking which may be applied to the vehicle wheels is limited by the adhesion between the wheels and rail, it becomes necessary in some instances to include as a part of the brake equipments for such trains and vehicles means for producing a braking effect on the track rails in order to obtain the high rates of retardation desired. Such rail brakes are usually of the magnetic track brake type.

Moreover, with the recent design of railway and traction vehicles for quiet operation it is undesirable that the full degree of braking available be applied to the rims of the vehicle wheels, due to the damage that may result from heating of the rubber inserts in these wheels. Therefore, to procure the necessary braking on the vehicle wheels the car motors are preferably utilized as dynamic brakes, with the shoe-on-wheel brakes suppressed until at about the time the vehicle comes to a stop. The shoe-on-wheel brakes are then applied as the dynamic brake decreases in effectiveness, thus providing sufficient braking to hold the train or vehicle at rest.

In order to not overheat and burn out the windings of the magnetic track brake devices when the train or vehicle is standing, it is desirable that these windings be deenergized as the vehicle or train comes to rest.

Where a combination of such brake systems as those referred to is employed, and embodying the desirable features mentioned, the control mechanism required becomes somewhat complicated and the manual manipulation and control of such a mechanism presents a problem different from that involved in the simple manipulation of the usual control device for a single brake system. In order that the operator may have flexible control over the entire composite brake system, a brake control handle should be provided which may be readily and easily manipulated, without a high opposing resistance, to control selectively and collectively the various individual brake systems. It is accordingly a principal object of the present invention to provide such a manual control, so that a high degree of flexibility may be obtained in the manipulation of such a composite brake system.

A further object of the present invention is to provide a brake system employing a fluid pressure brake, a magnetic track brake, and a dynamic brake, in which the dynamic and magnetic track brakes are normally applied with the fluid pressure brake suppressed until the train or vehicle nears the end of the stop, at which time the fluid pressure brake is applied, but which in emergency applications permits all three brakes to be applied.

It is a yet further object of the invention to provide a brake system as last mentioned with means for cutting the magnetic track brake out of action as the effectiveness of the dynamic brake diminishes due to decrease in speed of the vehicle or train.

Another object of the present invention is to provide alternate means for thermally controlling the duration of application of the magnetic track brake, instead of according to the effectiveness of the dynamic brake, which means may be rendered operable at selected times.

Yet another object of the invention is to provide a brake system of the character aforesaid embodying emergency features including a normally charged pipe, which when the pressure therein is reduced effects an emergency application of all of the various types of brakes employed.

Yet further objects dealing with specific constructions and arrangements of parts for carrying out the foregoing and other objects, will be more readily understood from the following description, which is taken in connection with the attached drawings, wherein, Fig. 1 is a diagrammatic and schematic arrangement of parts comprising one embodiment of the invention, adapted for a single vehicle.

Fig. 2 is a diagrammatic representation of the electric brake controller device shown centrally of Fig. 1.

Figs. 3, 4 and 5 are diagrammatic views of the valve mechanism shown to the upper left of Fig. 1, and depict, respectively, the communications established for service operation, release operation, and emergency operation of this mechanism.

Figure 1:
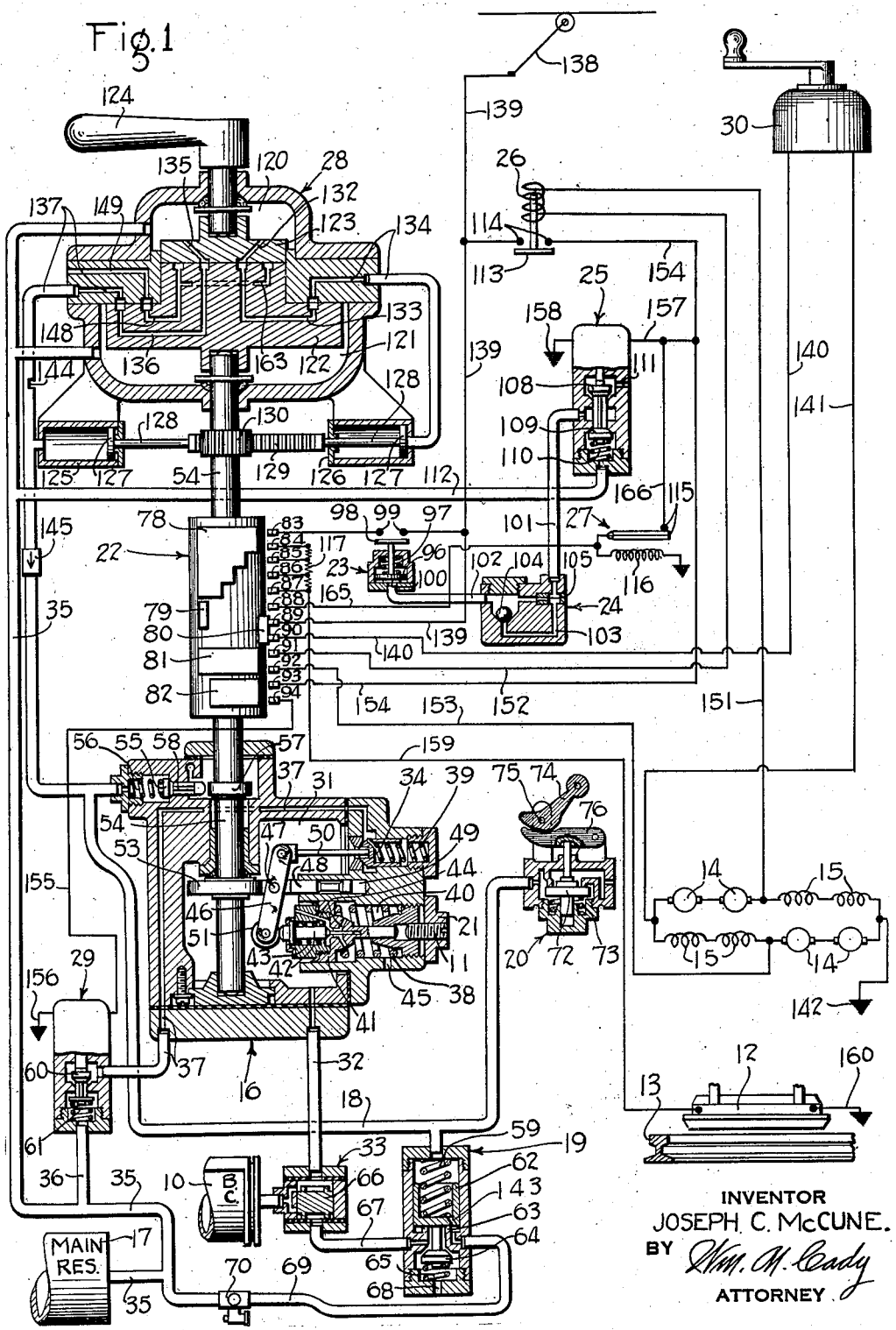

Referring now to Fig. 1 the fluid pressure brakes are represented by the brake cylinder 10, the magnetic track brakes by the track brake device 12, which is shown suspended above a rail 13, and the vehicle driving motors which may be connected to operate as dynamic brakes are represented by the motor armatures 14 and windings 15.

The fluid pressure brake system comprises a brake valve device 16 for controlling the supply of fluid under pressure from a main reservoir 17 to the brake cylinder 10, and for controlling the release of fluid under pressure from the brake cylinder 10. In addition, a normally charged pipe 18, an emergency valve device 19 and a conductor's valve device 20 are provided for effecting automatic or emergency applications of the fluid pressure brake system.

For controlling applications of the magnetic track brakes and dynamic brakes, there are provided a controller device 22, a pneumatic switch device 23, a communication valve device 24, a track brake controlling magnet valve device 25, an electrical relay 26, and a thermal relay 27.

For controlling manipulation of the brake valve device 16 and controller device 22 there is provided a fluid pressure control mechanism indicated at 28.

For suppressing the fluid pressure brakes during service applications of the dynamic and magnetic track brakes, there is provided a suppression magnet valve device 29.

Considering now more in detail the devices above referred to, the brake cylinder 10 is intended to diagrammatically illustrate any conventional form of fluid pressure applied friction type brake, such as the familiar clasp type brake having shoes operating upon the wheel treads; while the magnetic track brake device 12 is intended to represent any of the usual type magnetic track brakes wherein a plurality of such brake devices are suspended above a track rail, either by means of springs, pneumatic means, or electrical means. In the case of spring suspended devices it is intended that the magnetism of the brake devices will cause the shoe to engage the track rail, whereas if pneumatic or electrical means are employed these will be suitably actuated to bring the shoes into engagement with the track rail during application.

The vehicle driving motors, comprising armature 14 and winding 15, are intended to have power supplied thereto during acceleration and running of the vehicle by manipulation of a power controller 30. Upon applying the brakes, the power controller 30 is isolated from the vehicle motors and the motors are connected in a dynamic brake circuit, as will presently be described.

The brake valve device 15 is preferably embodied in a casing having a chamber 31, which is in constant open communication with a pipe 32 leading by way of double check valve device 33 to the brake cylinder 10. A supply valve 34 is provided for controlling the supply of fluid under pressure from the main reservoir 17 to the chamber 31, which supply may flow from the main reservoir by way of pipes 35 and 36, through the magnet valve device 29, pipe and passage 37, and past the supply valve 34 when unseated. The supply valve is normally held in a seated position by a spring 39, and is actuated to unseated position at desired times.

Operatively mounted in a chamber 40 in the valve device casing, is a movable abutment 41 in the form of a piston, which contains interiorly thereof a release valve 42 normally urged toward an unseated position by a spring 43. When in unseated position, a communication is established between the chamber 31 and the atmosphere, by way of passages 44, the chamber 40, and exhaust port 45. The movable abutment 41 is subject on its left hand side to pressure of fluid in the chamber 31 and on its right hand side to pressure of a spring 38. Tension on the spring 38 may be suitably adjusted by an adjusting member 21. A set screw 11 is provided to regulate the movement of the movable abutment 41 to the right.

For actuating the supply valve 34 and the release valve 42, there is provided a mechanism including spaced levers 46 pivotally mounted at 47 to a plunger 48 slidably disposed in a bore 49.

The upper ends of the spaced levers 46 are pivotally secured to a stem 50 which has one end thereof projecting into a recess in the supply valve 34. Rotatably carried between the lower ends of the spaced levers 46 is a roller 51 which is adapted to engage the stem of the release valve 42.

When the plunger 48 is actuated to the right, the spaced levers 46 will move with it, first fulcruming about their upper ends to seat the release valve 42 against tension of the spring 43, which is a lighter spring than either of the two springs 38 and 39, and after the release valve is thus seated, the spaced levers fulcrum about their lower ends to then unseat the supply valve 34 against opposition of spring 39. During this movement of the plunger 48, the regulating spring 38 is unappreciably compressed.

With unseating of the supply valve 34, fluid under pressure may flow to the chamber 31. As the pressure of this fluid increases, it acts upon the left side of the movable abutment 41 and actuates it to the right. As the movable abutment moves to the right the spaced levers 46 rotate in a counterclockwise direction about their pivot 47 to permit spring 39 to seat supply valve 34. As the supply valve 34 is seated the supply of fluid under pressure to chamber 31 will be lapped. The parts are so designed that the pressure at which the lap takes place corresponds to the degree of movement of the plunger 48 to the right.

For actuating the plunger 48 to the right, there is provided a cam 53 rigidly secured to an operating shaft 54. The configuration of the cam 53 is diagrammatically shown in Fig. 2, and, as will be seen from this figure, as the shaft 54 is rotated the cam progressively actuates plunger 48 to the right. It thus follows that the degree of rotation of the shaft 54 progressively increases the degree of application of the fluid pressure brakes. When the shaft 54 is rotated in an opposite direction the brakes are accordingly released.

The brake valve device 16 is also provided with an emergency valve 55, which is urged toward a seated position by a spring 56, and which is adapted to be actuated to an unseated position by action of a cam 57 also rigidly disposed on the shaft 54, which, as is depicted in Fig. 2, will for a certain rotation of the shaft 54 engage a stem 58 of the emergency valve to unseat it.

The magnet valve device 29 controls communication between the main reservoir 17 and the brake valve device 16, as shown. This valve device comprises a valve 60 which is urged toward an unseated position by a spring 61. In the upper part of the valve device is an electromagnet (not shown) which when energized actuates the valve 60 to seated position. Thus so long as the electromagnet is deenergized an open communication is maintained between the main reservoir 17 and the brake valve device 16, but when the electromagnet is energized this communication is cut off.

The emergency valve device 19 is embodied in a casing having a movable abutment 62 in the form of a valve urged into engagement with a valve seat 63 by a spring 59. The abutment 62 has attached thereto a poppet valve 64 which is maintained in unseated position when the abutment 62 is in seated position. A spring 65 below the poppet valve 64 urges the poppet valve toward seated position and the valve 62 toward unseated position. The parts are so designed that when there is no or a low pressure in the chamber above the valve 62, the spring 65 will predominate and seat the poppet valve 64 and unseat the valve 62. When however pressure above a chosen value exists in the chamber above the valve 62, the valve 62 will be seated and the poppet valve 64 will be unseated.

For this latter condition, the poppet valve 64 opens a communication between a chamber below valve 66 in the double check valve device 33 and the atmosphere, by way of pipe 67, past the unseated poppet valve 64, and exhaust port 68. When the poppet valve 64 is seated and the valve 62 is unseated, the communication to the atmosphere is closed and a communication is established between the main reservoir 17 and the chamber beneath the valve 66, by way of pipes 35 and 69, the unseated valve 62 and pipe 67. A pressure limiting valve device 70, such for example as the well known feed valve device, is interposed in the pipe 69, so as to limit the pressure of fluid supplied through this communication to a value less than main reservoir pressure.

The conductor's valve device 20 is embodied in a casing provided with a valve 72 which is urged toward seated position by a spring 73. The valve 72 is unseated by operating a lever 74 about its pivot 75 in a counterclockwise direction. This movement actuates an arm 76 downwardly which by engagement with the valve stem unseats it against opposition of the spring 73.

The normally charged pipe 18, which may be identified by either of such common names as the emergency pipe, brake pipe, safety control pipe, or the like, is connected to the conductor's valve device 20, the emergency valve device 19, and the brake valve device 16, as shown. It should thus be apparent that this pipe may be vented to the atmosphere either by unseating of the emergency valve 55 in the brake valve device 16, by unseating of the valve 72 in the conductor's valve device 20, or by rupture of the pipe, and that upon venting of the pipe the valve 62 in the emergency valve device 19 will be unseated while the poppet valve 64 will be seated.

The control device 22 is preferably arranged in the form of a drum having secured thereto and insulated therefrom separate contact segments 78, 79, 80, 81 and 82, disposed on the drum for respective engagement with stationary contact fingers 83 to 94 inclusive, as is diagrammatically indicated in Fig. 2. The controller device is rigidly disposed on the shaft 54, or an extension thereof, and rotatable with the aforedescribed cams 53 and 57 in a sequence as is clearly depicted in Fig. 2.

As will be observed from Fig. 2, when the controller device is in "release" position the contact fingers 89 and 90 are engaged by the segment 80, while all other contact fingers are disengaged by their respective segments. The cam 53 permits the valve mechanism controlled thereby to be conditioned as is shown in Fig. 1, while the cam 57 permits the emergency valve 55 to be seated. It will also be observed from Fig. 2, that the controller device 22 is operable through a "service zone" to a "full service" position, and also to an "emergency" position. The functioning of the controller device in these various positions will be hereinafter more fully described.

The pneumatic switch device 23 is embodied in a casing having a piston 96 urged downwardly by a spring 97 to cause a movable contact 98 to disengage from stationary contacts 99, and urged upwardly upon supply of fluid under pressure to a chamber 100 to cause engagement of these contacts.

The communication valve device 24 comprises a casing providing two communications between an inlet pipe 101 and an outlet pipe 102. When fluid under pressure is supplied to the inlet pipe 101 it may flow by way of a passage 103 past a ball valve 104, which will be unseated by the pressure of the fluid, and to the outlet pipe 102. When the supply is cut off and fluid under pressure is to be released from the pipe 102, back flow through the passage 103 is prevented by the ball valve 104, and must take place through a choke 105, which restricts the rate sufficiently to cause a definite interval of time to elapse before the pressure in the pipe 102 will have been reduced below a predetermined value, which value is that which causes switch device 23 to open its contacts 99.

The magnetic track brake application magnet valve device 25 is embodied in a casing provided with a release valve 108 and a supply valve 109. A spring 110 urges the supply valve 109 toward seated position and the release valve 108 toward unseated position. An electromagnet (not shown) in the upper part of the valve device casing operates when energized to seat the release valve 108 and unseat the supply valve 109. As is shown in the drawings, when the release valve 108 is unseated the pipe 101 is connected to the atmosphere by way of exhaust port 111, and when the release valve is seated and the supply valve 109 is unseated, fluid under pressure is supplied from the main reservoir 17 to the pipe 101, by way of pipe 35 and 112, and past the unseated supply valve 109.

The electrical relay 26 may be of any of the usual types having a winding and a movable contact 113 adapted when the winding is energized to bridge and close stationary contacts 114.

The thermal relay 27 is preferably of the type which operates to open contacts 115 when the temperature of an associated heating coil 116 reaches a predetermined value due to flow of an electric current therein. As shown, the movable one of the contacts 115 comprises a bi-metallic element which upon response to a predetermined temperature, due to heat from the heating coil 116, moves downwardly to disengage from the other contact 115. The heating coil 116 is connected so that it is unaffected by the current controlled by the contacts.

The operating mechanism 28 comprises a casing having two chambers 120 and 121, both of which are connected to pipe 35 leading to the main reservoir 17. Disposed in the lower chamber 121 and rigidly secured to and rotatable with the shaft 54, or an extension thereof, is a rotary valve 122. This rotary valve forms a seat for a second or upper rotary valve 123 disposed in the upper chamber 120. The upper rotary valve 123 is manually rotatable by a brake control handle 124.

Attached to the casing of the control mechanism are two cylinders 125 and 126, each having disposed therein a piston 127. The two pistons 127 are connected by a stem 128 having secured thereto, or formed integrally therewith, a rack 129 meshing with a gear 130 disposed on and secured to the shaft 54.

The two rotary valves 122 and 123 control the supply of fluid under pressure to and its release from the two cylinders 125 and 126, as will hereinafter be more fully described, for the purpose of controlling rotation of the shaft 54.

The operation of this embodiment of my invention is as follows:

Running condition

When the vehicle is being driven under power, the brake control handle 124 is maintained in the "release" position. With this handle in release position the two rotary valves 122 and 123 have relative positions so that fluid under pressure is supplied to the cylinder 126 through a communication between the upper chamber 120 and the cylinder 126, by way of port 132 in rotary valve 123, port 133 in rotary valve 122, and pipe and passage 134. At the same time, fluid under pressure is also supplied to the same degree to the cylinder 125 from chamber 120, through a communication including port 135 in rotary valve 123, port 136 in rotary valve 122, and pipe and passage 137. The brake valve device 16 and controller device 22 will then be maintained in release position as both shown and indicated in Figs. 1 and 2.

The operator may then supply current to the vehicle driving motors through a circuit from a trolley 138, which circuit includes, beginning with the trolley conductor 139, contacts 88, 89 and 90 of the controller device 22, conductor 140, the power controller 30, conductor 141, the vehicle motors, and ground connection 142.

With the brake control handle 124 maintained in release position during running of the vehicle, the pipe 18 may be maintained charged through one or both of two communications. The first communication is by way of restricted port 143 in the valve 62 of the emergency valve device 19, while the other communication is from the control mechanism 28 past a choke device 144, and a one way check valve device 145. Valve 62 of the emergency valve device 19 will thus be maintained in seated position, while the poppet valve 64 will be maintained in unseated position.

Service application

When it is desired to effect a service application of the brakes, the brake control handle 124 is moved into the "service zone" to a degree according to the desired degree of braking. As the handle 124 is thus moved, the rotary valve 123 moves with it, thus establishing communications as are diagrammatically shown in Fig. 3. As will be seen from this figure, the supply of fluid under pressure to the cylinder 126 is maintained, while the supply to the cylinder 125 is cut off and this cylinder vented to the atmosphere, by way of cavity 147 in the rotary valve 123, port 148 in the rotary valve 122, and exhaust passage 149.

The pressure exerted on piston 127 in the cylinder 126 will then overbalance that exerted on the piston in the cylinder 125, so that the rack 129 will be actuated to the left and thus rotate the shaft 54 in a direction such that, as viewed in Fig. 2, the drum contacts and cams move to the right.

When the shaft 54 has rotated through an angle corresponding to that through which the handle 124 is moved, the lower rotary valve 122, which moves with the shaft, will have reached a position where the communications shown in Fig. 1 are reestablished. Fluid under pressure will then again be supplied to the cylinder 125 to the same degree as that supplied to the cylinder 126, thus arresting movement of the shaft 54. It will thus be apparent that the degree of movement of the brake controller handle 124 determines the degree of rotation of the shaft 54.

As the drum of the controller device 22 rotates, contact segment 80 disengages from the two contact fingers 89 and 90, to isolate the power controller 30 from the vehicle driving motors, so that it is immaterial whether this controller device has been actuated to off position or not.

Simultaneous with this operation, the segment 81 engages and connects together the two contact fingers 91 and 92. This connects the vehicle driving motors in a dynamic braking circuit consisting of conductors 151, relay 26, conductor 152, contacts 81, 91 and 92 of the controller device 22, and conductor 153. With the flow of current in this circuit, the relay 26 closes its contacts 114, establishing a circuit from the trolley 138 to the suppression magnet valve device 29, which circuit includes, beginning at the trolley, conductor 139, contacts 113 and 114 of relay 26, conductor 154, contacts 82, 93 and 94 of the controller device 22, which were engaged when the dynamic braking circuit was established, conductor 155, the magnet valve device 29, and ground connection 156.

The electromagnet in the magnet valve device 29 is thus energized to close communication between the main reservoir 17 and the brake valve device 16. Thus although rotation of the shaft 54 operates the valve mechanism in the brake valve device 16, as described, to establish communication to the brake cylinder 10, fluid under pressure is prevented from flowing thereto due to energization of the suppression magnet valve device 29.

When the contacts 113 and 114 of relay 26 close, they also establish a circuit to the magnetic track brake application magnet valve device 25, which circuit includes, beginning at the aforementioned conductor 154, conductor 157, the magnet valve device 25, and ground connection 158. Energization of this magnet valve device effects seating of its release valve 108 and unseating of its supply valve 109. Fluid under pressure then flows from the main reservoir through pipes 35 and 112, past the unseated supply valve 109, through pipe 101, passage 103 of the communication valve device 24, and pipe 102 to chamber 100 in the pneumatic switch device 23.

This switch device then closes contacts 99, so that with rotation of the controller device 22 a circuit is established from the trolley 138 to the track brake device 12, which circuit includes, conductor 139, contacts 98 and 99, contact 83 and one or more of contacts 84 to 87, inclusive, depending upon the degree of rotation of the controller device 22, a portion of resistance 117, conductor 159, the track brake device 12, and ground connection 160. It will thus be seen that for the sequence illustrated, the dynamic brakes will be initially applied, followed immediately by application of the track brakes, whereas the fluid pressure brakes will be suppressed.

While a particular preferred sequence has been illustrated, it will be quite apparent that this sequence may be varied as desired.

Now as the speed of the vehicle diminishes the effectiveness of the dynamic brakes will decrease at low speeds, so that at some predetermined speed the relay 26 will be insufficiently energized to maintain contacts 114 closed. When these contacts are thus opened both the track brake magnet valve device 25 and the suppression magnet valve device 29 will be deenergized. Deenergization of the magnet valve device 25 will effect the release of fluid under pressure from the switch device 23, which release will now take place through the choke 105, so that a predetermined interval of time will elapse before the track brake device will be deenergized.

Deenergization of the magnet valve device 29 will permit fluid under pressure to be supplied from the main reservoir 17 through the brake valve device 16 to the brake cylinder 10. Therefore, by the time the magnetic track brakes are released the fluid pressure brakes will have been applied to the degree determined by the position of handle 124, thus insuring prompt stopping of the vehicle and holding it at rest.

During this operation of the brake valve device 16 the emergency valve 55 will remain seated, as is indicated in the diagrammatic view in Fig. 2.

If it is desired to effect a release of the brakes after they have been applied, the brake control handle 24 is turned to "release" position. As the handle is thus moved, the upper rotary valve 123 will move with it and will assume a position with respect to the lower rotary valve 122 as is diagrammatically shown in Fig. 4. As may be seen from this figure, the cylinder 126 will be vented to the atmosphere by way of cavity 162 in the rotary valve 123, ports 163 and 148 in the rotary valve 122, and exhaust port 149.

At the same time, fluid under pressure will continue to be supplied to the cylinder 125 through ports 135 and 136, and pipe and passage 137. The pressure on piston 127 in cylinder 125 will then actuate the rack 129 to the right, rotating the shaft 54 in a direction such that the controller drum, as diagrammatically shown in Fig. 2, will move to the left. The lower rotary valve 22 will likewise move with the shaft and when it has reached a position such that the communications shown in Fig. 1 are reestablished the rotation of the shaft 54 will be arrested, with the result that the different brake systems will be released.

If during an application it is desired to graduate the application or the release, it will be apparent that the brake control handle 24 may be moved back and forth in the "service zone" to effect any desired degree of application of the brakes.

*Emergency application*

An emergency application of the brakes may be effected in either of three ways. The normal manner of effecting an emergency application is by movement of the brake control handle 124 to "emergency" position, which is diagrammatically shown in Fig. 2. Another way is by manipulation of the lever 74 of the conductor's valve device 20. A third way is by rupture of the charged pipe 18, as by accident or the development of a leak.

Considering now the first way, when the brake controller handle 124 is turned to the "emergency" position, both the brake valve device 16 and control device 22 are operated as before, to first effect an application of the dynamic brakes, followed by an application of the magnetic track brakes to the maximum degree. Operation of the brake valve device 16 establishes communication to the brake cylinder 10, and at the same time unseats the emergency valve 55. Before the controller device 22 reaches emergency position, the contact segment 82 passes out of engagement with the contact fingers 93 and 94, thereby preventing energization of the suppression magnet valve device 29 through closure of contacts 114 of relay 26. Thus it will be apparent that for the emergency position of the control handle 124, the dynamic brakes, the magnetic track brakes, and the fluid pressure brakes are all applied, and to the maximum degree.

In addition, in the emergency position, the contact segment 79 of the controller device 22 connects the two contact fingers 88 and 89, which establishes in parallel with the circuit through the contacts 114 of relay 26 a second circuit to the magnet valve device 25. This second circuit includes, beginning at the trolley wire 139, contacts 79, 88 and 89 of the controller device 22, conductor 165, contacts 115 of thermal relay 27, and conductor 166. Therefore, even though the contacts 114 of relay 26 should be opened, the magnet valve device 25 will be maintained energized so long as contacts 115 of the thermal relay are closed and controller device 22 remains in emergency position. The purpose of this is to prevent release of the magnetic track brakes at the time the effectiveness of the dynamic brakes diminishes due to decrease in speed.

When the pressure in the charged pipe 18 was reduced, spring 65 in the emergency valve device 19 actuates the poppet valve 64 to seated position and the valve 62 to unseated position. Thus communication is established between the main reservoir 17 and the chamber beneath the valve 66 in double check valve 33, as heretofore described. Therefore, if for any reason the supply from the brake valve device 16 fails to materialize, then an auxiliary supply through the emergency valve device 19 is available, in which case, the valve 66 in the double check valve 33 will be shifted to its upper position to permit the flow to the brake cylinder 10. This insures that the vehicle will be stopped in case of failure of any portion of the normal control means, faulty operation of the suppression magnet valve device 19, or other faults existing when the control handle 124 is turned to "emergency" position.

As the speed of the vehicle diminishes the braking effect produced by the dynamic brakes will decrease. But the braking effect due to the magnetic track brakes and the fluid pressure brakes will be adequate to insure an emergency stop. The thermal relay 27, which functions to open contacts 115 as a function of temperature, is designed to maintain the track brakes applied for an interval of time which is normally somewhat greater than that required to make an emergency stop from the maximum operating speed. When however the predetermined temperature is reached contacts 115 will be opened, resulting in release of the magnetic track brakes, and thus preventing damage to the windings of these brakes due to prolonged overheating.

When the handle 124 is moved to emergency position, a communication is established between the cylinder 125 and the atmosphere, by way of cavity 167 in the lower rotary valve 122 and exhaust port 149, as is indicated in Fig. 5. This communication is maintained throughout the rotation of shaft 54 to emergency position, where rotation of the shaft is arrested by the extent of movement of pistons 127 in cylinders 125 and 126.

Considering now an emergency application due to operation of the conductor's valve 20, or a break or leak in the charged pipe 18, it will be apparent that when either the conductor's valve is operated to reduce pressure in pipe 18, or the pressure is reduced due to a broken pipe, that the emergency valve device 19 will function as before described to supply fluid under pressure from the main reservoir to the lower side of valve 66 in the double check valve 33. Also, as the pressure is reduced in pipe 18 a corresponding reduction is effected in the cylinder 125. The choke 144 prevents undue loss of fluid from the main reservoir through the control mechanism 28 when the pipe 18 is vented.

With the drop of pressure in cylinder 125 the controller device 22 and brake valve device 16 will be operated as heretofore described to emergency position, to effect an emergency application of all three brake systems. Fluid under pressure will then be supplied to the brake cylinder 19 by the brake valve device 16, or if this valve device should for any reason fail to function, or the suppression magnet valve device 29 prevent the supply, then the emergency valve device 19 will accomplish this.

If the application had been effected by operation of the conductor's valve device 20 and this valve device then closed, a release of the brakes will be effected as the pressure in pipe 18 is restored due to supply from the control mechanism 28 past the choke 144 and check valve 145. If, however, the application has been due to a broken pipe, it will be obvious that repairs will be required before a release can be effected.

It should be apparent from the foregoing description that when the pressure in the cylinder 125 is varied due to manipulation of the brake control handle 124, the check valve 145 will prevent a corresponding variation of pressure in the charged pipe 18, so that the emergency feature of the brake system is maintained at all times while the brake control handle 124 is manipulated in the "service zone".

While I have illustrated and described my invention with particular reference to one embodiment thereof, it is not my intention to be limited to the details of this embodiment or otherwise than by the spirit and scope of the appended claims.

Having now described my invention, what I claim as new and desire to secure by Letters Patent, is:

1. In a vehicle brake system, in combination, fluid pressure brake means, dynamic brake means, magnetic track brake means, a plurality of control means mechanically interconnected and operable in unison for controlling applications of said three brake means, a first fluid pressure operated means for actuating said control means to various application positions, a second fluid pressure operated means for actuating said control means from application position to release position, a control handle, and means for supplying fluid under pressure to and releasing it from said two fluid pressure operated means according to the positioning of said control handle.

2. In a vehicle brake system, in combination, fluid pressure brake means, magnetic track brake means, dynamic brake means, control means comprising a brake valve and an electric brake controller mechanically interconnected, and operable to various application positions to effect application of said three brake means and operable from application position to release position to effect the release of said three brake means, a first fluid pressure operated device for actuating said control means to application position, a second fluid pressure operated device for actuating said control means to release position, manually operated valve means for effecting a supply of fluid under pressure to said first fluid pressure operated device, and valve means rotatable with said control means for subsequently effecting a supply of fluid under pressure to said second fluid pressure operated device.

3. In a vehicle brake system, in combination, fluid pressure brake means, dynamic brake means, magnetic track brake means, a brake valve device for controlling the supply of fluid under pressure to said fluid pressure brake means, a control device for jointly controlling the operation of said dynamic and magnetic track brake means, common means for simultaneously actuating said brake valve device and said control device, fluid pressure operated means operated upon unbalance of fluid pressures in one direction to actuate said common means in an application direction and operable upon balanced pressure therein to arrest movement of said common means and upon unbalance of pressures in an opposite direction to actuate said common means in a release direction, a first valve rotatable with said common means, a second valve manually operable and coacting with said first valve, said two valves providing for relative movement therebetween, and means controlled according to the relative movement between said two valves for controlling the balance or unbalance of fluid pressures in said fluid pressure operated means.

4. In a vehicle brake system, in combination, a first rotary valve, a second rotary valve providing a seat for said first rotary valve, manually operated means for manually operating said first rotary valve to establish a single communication through which fluid under pressure is supplied, said second valve being operable as a result of fluid under pressure supplied through said single communication to establish a second communication through which fluid under pressure is also supplied concurrently with supply through said first communication, said second valve being arrested in its movement upon establishing of said second communication, said first valve being manually movable thereafter to close said first mentioned communication and to maintain said second mentioned communication open, whereby as a result said second valve is caused to move in an opposite direction to reestablish said first communication while maintaining said second communication open.

5. In a vehicle brake system, in combination, electric brake means, fluid pressure brake means, electroresponsive means adapted when energized to suppress said fluid pressure brake means, a circuit for energizing said electroresponsive means, a plurality of sets of normally open contacts in said circuit, a control device operable to an application position to effect an application of said electric brake means and to close one set of said contacts, and a relay responsive to operation of said electric brake means for closing the other set of said contacts.

6. In a vehicle brake system, in combination, a brake cylinder, an electric brake device, a brake valve device operable to application position to effect a supply of fluid under pressure to said brake cylinder, a controller device operable to application position to effect an application of said electric brake means, a magnet valve device operable when energized to prevent the supply of fluid under pressure to said brake cylinder, a circuit for energizing said magnet valve device, a relay connected to said electric brake device and operable when said electric brake means is effective to close a portion of said circuit, and normally open contacts adapted to complete said circuit when said controller device is moved to application position.

7. In a vehicle brake system, in combination, electric brake means, means for establishing a circuit through which current is supplied to effect an application of said electric brake means, a fluid pressure operated switch device controlling said circuit and operable when fluid under pressure is supplied thereto to close said circuit and when fluid under pressure is released therefrom to open said circuit, means for establishing an unrestricted communication when fluid under pressure is supplied to said switch device, and means for establishing a restricted communication through which fluid under pressure is released from said switch device.

8. In a vehicle brake system, in combination, electric brake means, means for establishing a circuit through which current is supplied to effect an application of said electric brake means, a fluid pressure operated switch device controlling said circuit and operable when fluid under pressure is supplied thereto to close said circuit and when fluid under pressure is released therefrom to open said circuit, means for establishing an unrestricted communication when fluid under pressure is supplied to said switch device, means for establishing a restricted communication through which fluid under pressure is released from said switch device, and a magnet valve device for controlling the supply of fluid under pressure to and its release from said switch device.

9. In a vehicle brake system, in combination, magnetic track brake means, dynamic brake means, a circuit through which current is supplied to effect application of said magnetic track brake means, a fluid pressure operated switch device controlling said circuit and operable when fluid under pressure is supplied thereto to close said circuit and when fluid under pressure is released therefrom to open said circuit, means establishing an unrestricted communication through which fluid under pressure is supplied to said switch device and establishing a restricted communication through which fluid under pressure is released from said switch device, a magnet valve device controlling the supply of fluid under pressure to and its release from said switch device through said last means, and means controlled by said dynamic brake means for controlling operation of said magnet valve device.

10. In a vehicle brake system, in combination, vehicle driving motors adapted at one time to drive the vehicle and at another time to operate as dynamic brakes, a power controller for supplying current to said motors when driving the vehicle, magnetic track brake means, a brake controller operable to application position to simultaneously effect an application of said magnetic track brake means and to disconnect said motors from said power controller and connect said motors in a dynamic braking circuit, and means controlled by the vehicle motors when operating as dynamic brakes for controlling the duration of application of the magnetic track brake means.

11. In a vehicle brake system, in combination, magnetic track brake means, means for establishing a circuit through which current is supplied to said magnetic track brake means to effect energization thereof, means for also establishing at the same time a timing circuit adapted when opened to effect deenergization of said track brake means, and thermal means operable at a predetermined temperature to open said timing circuit.

12. In a vehicle brake system, in combination, electric brake means, means for establishing a closed timing circuit, means operable so long as said timing circuit is closed for effecting an application of said electric brake means, and operable when said timing circuit is opened to effect a release of said brake means, and thermal means associated with said timing circuit and operable at a chosen temperature established by flow of current therein for opening said timing circuit.

13. In a vehicle brake system, in combination, magnetic track brake means, dynamic brake means, means for effecting an application of said dynamic brake means, means operable upon effecting an application of said dynamic braking means for effecting an application of said track brake means and for normally effecting a release of said track brake means when the effectiveness of said dynamic brake means decreases below a chosen degree, thermal means, and means selective at will for transferring control of said track brake means from said dynamic brake means to said thermal means.

14. In a vehicle brake system, in combination, dynamic brake means, magnetic track brake means, a controller device operable to an application position to effect an application of said dynamic brake means and to partially establish a circuit through which current is supplied to energize said magnetic track brake means, means responsive to the application of said dynamic brake means for completing said circuit to said track brake means and for subsequently opening said circuit when the effectiveness of said dynamic brake means decreases below a chosen value, thermal means having a heat producing unit and contacts adapted to be operated at a predetermined temperature produced by said heating unit, and means responsive to movement of said controller device to a different application position for transferring control of said magnetic track brake circuit from said dynamic brake means to said thermal means.

15. In a vehicle brake system, in combination, fluid pressure brake means, dynamic brake means, magnetic track brake means, a brake valve device operable to supply fluid under pressure to said fluid pressure brake means, a controller device operable to effect an application of said dynamic brake means and to establish a circuit through which current is supplied to effect energization of said magnetic track brake means, electroresponsive valve means responsive to operation of said dynamic brake means for preventing the supply of fluid under pressure to said fluid pressure brake means so long as said dynamic brake means is effective above a chosen degree, electroresponsive means for controlling opening and closing of the circuit through which current is supplied to effect energization of said magnetic track brake means, a relay controlled by said dynamic brake means for controlling operation of said electroresponsive means, thermal means for also controlling operation of said electroresponsive means, and means for manually selecting which of said relay and thermal means shall control said electroresponsive means.

16. In a vehicle brake system, in combination, brake means, a control device having fluid pressure means associated therewith and operable upon a balance of a plurality of fluid pressures therein to maintain said brake means released and operable upon a chosen unbalance of said fluid pressures therein to operate said control device to application position to effect an application of said brake means, and a pipe normally charged with fluid under pressure and connected to said fluid pressure means and being adapted upon a decrease of pressure therein to effect an unbalance of said pressures in said fluid pressure means to cause said control device to be actuated to application position.

17. In a vehicle brake system, in combination, brake means, a control device for controlling application of said brake means, two fluid pressure operated devices associated with said control device, said two fluid pressure operated devices being supplied with fluid under pressure to the same degree when said control device is in release position and being operable upon a decrease of pressure in one of said fluid pressure operated devices to cause said control device to be actuated to application position, a normally charged pipe connected to one of said fluid pressure operated devices and charged when said fluid pressure operated device is charged, and being adapted to reduce the pressure in said connected fluid pressure operated device when the pressure in said pipe is reduced, and means for reducing the pressure of fluid in said pipe.

18. In a vehicle brake system, in combination, brake means, control means for controlling application of said brake means, two fluid pressure operated devices associated with said control means and operable when fluid under pressure to the same degree is supplied to both of said devices to maintain said control means in release position, and operable when the pressure in one of said devices is diminished to actuate said control means to application position, a normally charged pipe connected to one of said devices, means for varying at will the pressure of fluid in said last mentioned device, means for preventing the said variation at will of pressure in said device from effecting a reduction of pressure in said pipe, and means whereby a reduction of pressure in said pipe effects a corresponding reduction of pressure in said connected device.

19. In a vehicle brake system, in combination, a brake cylinder, a brake valve device for controlling the supply of fluid under pressure to and its release from said brake cylinder, two fluid pressure operated devices for controlling operation of said brake valve device according to the difference of pressures established in said devices, manually operated means for varying the pressures in said devices according to the degree of pressure desired in said brake cylinder, a pipe normally charged with fluid under pressure, means responsive to a reduction of pressure in said pipe for effecting a supply of fluid under pressure to said brake cylinder independently of operation of said brake valve device, and means also responsive to the same reduction of pressure in said pipe for causing a difference of pressures in said fluid pressure operated devices to effect operation of said brake valve device to also supply fluid under pressure to said brake cylinder.

20. In a vehicle brake system, in combination, fluid pressure brake means, electric brake means, a control mechanism for controlling applications of said two brake means, two fluid pressure operated devices for controlling operation of said control mechanism according to the unbalance of fluid pressures in said two devices, means for manually controlling the pressures in said two devices, a pipe normally charged with fluid under pressure, and means responsive to a reduction of pressure in said pipe for adjusting the pressure in one of said devices to cause said control mechanism to be actuated to an emergency application position to effect an emergency application of said electric and fluid pressure brake means.

21. In a vehicle brake system, in combination, brake means, two valves having relative movement with respect to each other, means for manually moving one of said valves with respect to the other, for effecting an application of said brake means, means operable as said brake means is applied for moving said second valve coextensive with movement of said first valve to effect a lap of application of said brake means, a pipe normally charged with fluid under pressure, and means responsive to a reduction of pressure in said pipe for moving said second valve to a position for effecting an emergency application of said brake means.

22. In a vehicle brake system, in combination, magnetic track brake means, dynamic brake means, means for effecting an application of said two brake means, means controlled according to the effectiveness of said dynamic brake means for controlling the duration of application of said magnetic track brake means, thermal control means, a pipe normally charged with fluid under pressure, and means responsive to a reduction of pressure in said pipe for transferring control of duration of application of said magnetic track brake means from said dynamic brake means to said thermal means.

23. In a vehicle brake system, in combination, electric brake means, fluid pressure brake means, a normally charged pipe in which the pressure of fluid is reduced and a normally discharged pipe to which fluid under pressure is supplied, to effect an application of the fluid pressure brake means, an electric controller device for controlling the application of the electric brake means, a brake valve device for controlling reduction of pressure in said normally charged pipe and the supply of fluid under pressure to said normally discharged pipe, means normally subject to fluid under pressure and operated upon a reduction of pressure to operate said electric controller device and said brake valve device, and a pair of relatively movable valves for controlling the pressure acting on said last means.

24. In a vehicle brake control system, in combination, brake control means, a first fluid pressure operated device for actuating said brake control means in an application direction, a second fluid pressure operated device for actuating said brake control means in a release direction, two relatively movable valves, a brake control handle, one of said valves being movable with said brake control means and the other of said valves being movable by said brake control handle, said two valves being so ported that when said handle is in release position fluid under pressure is supplied to both of said fluid pressure operated devices, and when said handle is moved to application position fluid under pressure is released from said second device whereby the said first device actuates said brake control means and said associated valve to a position corresponding to the position of said brake control handle, said two valves in this position of said brake control means effecting a supply of fluid under pressure to both of said fluid pressure operated devices, the ports in said valves being so arranged that upon movement of said handle to release position fluid under pressure is released from said first device whereby said second device actuates said brake control means to release position.

JOSEPH C. McCUNE.